United States Patent
Lefurgy et al.

(10) Patent No.: US 7,155,623 B2
(45) Date of Patent: Dec. 26, 2006

(54) METHOD AND SYSTEM FOR POWER MANAGEMENT INCLUDING LOCAL BOUNDING OF DEVICE GROUP POWER CONSUMPTION

(75) Inventors: Charles R. Lefurgy, Round Rock, TX (US); Eric Van Hensbergen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 10/727,320

(22) Filed: Dec. 3, 2003

(65) Prior Publication Data

US 2005/0125703 A1     Jun. 9, 2005

(51) Int. Cl.
G06F 1/00 (2006.01)
(52) U.S. Cl. .................. 713/324; 713/321; 713/323; 711/136; 711/160; 711/167
(58) Field of Classification Search ............... 713/300, 713/310, 320, 321, 322, 323, 324, 330, 340, 713/400, 401, 500, 501, 502, 600, 601
See application file for complete search history.

(56) References Cited

U.S. PATENT DOCUMENTS

| | | | |
|---|---|---|---|
| 5,148,546 A | | 9/1992 | Blodgett |
| 5,404,543 A | * | 4/1995 | Faucher et al. .............. 713/323 |
| 5,423,045 A | | 6/1995 | Kannan et al. |
| 5,535,401 A | | 7/1996 | Rawson, III et al. |
| 5,546,591 A | | 8/1996 | Wurzburg et al. |
| 5,623,647 A | | 4/1997 | Maitra et al. |
| 5,987,614 A | | 11/1999 | Mitchell et al. |
| 6,330,639 B1 | | 12/2001 | Fanning et al. |
| 6,512,652 B1 | | 1/2003 | Nelson et al. |
| 6,657,634 B1 | | 12/2003 | Sinclair et al. |
| 6,704,877 B1 | * | 3/2004 | Cline et al. .................. 713/320 |
| 6,775,787 B1 | * | 8/2004 | Greene ......................... 713/340 |
| 6,834,353 B1 | * | 12/2004 | Smith et al. ................. 713/320 |
| 6,996,441 B1 | | 2/2006 | Tobias |

(Continued)

OTHER PUBLICATIONS

Mizumo, et al., "Chip OS: Open Power-management Platform to Overcome the Power Crisis in Future LSIs" IEEE ISSC Conference, 2001, USA.

(Continued)

Primary Examiner—Lynne H. Browne
Assistant Examiner—James F. Sugent
(74) Attorney, Agent, or Firm—Mitch Harris, Atty at Law, LLC; Andrew M. Harris; Casimer K. Salys (57) ABSTRACT

A method and system for power management including local bounding of device group power consumption provides the responsiveness of local power control while meeting global system power consumption and power dissipation limits. At the system level, a global power bound is determined and divided among groups of devices in the system so that local bounds are determined that meet the global system bound. The local bounds are communicated to device controllers associated with each group of devices and the device controllers control the power management states of the associated devices in the group to meet the local bound. Thus, by action of all of the device controllers, the global bound is met. The controllers may be memory controllers and the devices memory modules, or the devices may be other devices within a processing system having associated local controllers. Alternatively or in concert, the devices may be entire processing systems and the associated controller a power management controller for associated processing systems, whereby multiple processing locales may be power-managed consistent with a global power consumption budget.

15 Claims, 4 Drawing Sheets

U.S. PATENT DOCUMENTS

| | | |
|---|---|---|
| 7,000,130 B1 * | 2/2006 | Adachi ................ 713/322 |
| 2002/0004913 A1 * | 1/2002 | Fung .................... 713/300 |
| 2003/0210247 A1 | 11/2003 | Cui et al. |
| 2004/0044914 A1 | 3/2004 | Gedeon |
| 2004/0083478 A1 | 4/2004 | Chen et al. |
| 2004/0236896 A1 * | 11/2004 | Kanapathippillai et al. . 711/100 |
| 2004/0260957 A1 * | 12/2004 | Jeddeloh et al. ............ 713/300 |
| 2005/0125701 A1 | 6/2005 | Van Hensbergen et al. |
| 2005/0125702 A1 | 6/2005 | Keller et al. |
| 2005/0138442 A1 | 6/2005 | Huang et al. |
| 2005/0160151 A1 | 7/2005 | Rawson, III et al. |

OTHER PUBLICATIONS

Gunther, et al., "Managing the Impact of Increasing Microprocessor Power Consumption", Intel, 2001, USA, web publication at http://developer.intel.com.

* cited by examiner

METHOD AND SYSTEM FOR POWER MANAGEMENT INCLUDING LOCAL BOUNDING OF DEVICE GROUP POWER CONSUMPTION

CROSS-REFERENCE TO RELATED APPLICATIONS

The present application is related to previously-filed U.S. patent application Ser. No. 10/727,319, entitled "METHOD AND SYSTEM FOR POWER MANAGEMENT INCLUDING DEVICE CONTROLLER-BASED DEVICE USE EVALUATION AND POWER-STATE CONTROL", the specification of which is herein incorporated by reference.

BACKGROUND OF THE INVENTION

1. Technical Field

The present invention relates generally to power management in processing systems, and more particularly, to a power management scheme that includes local bounding and control of device power consumption within a processing system.

2. Description of the Related Art

Present-day computing systems include sophisticated power-management schemes for a variety of reasons. For portable computers such as "notebook", "laptop" and other portable units including personal digital assistants (PDAs), the primary power source is battery power. Intelligent power management extends battery life, and therefore the amount of time that a user can operate the system without connecting to a secondary source of power. Power management has also been implemented over "green systems" concerns so that power dissipated within a building is reduced for reasons of energy conservation and heat reduction.

Recently, power management has become a requirement in line power connected systems, particularly high processing power cores and systems because the components and/or systems are now designed with total potential power consumption levels that either exceed power dissipation limits of individual integrated circuits or cabinets, or the total available power supply is not designed to be adequate for operation of all units simultaneously. For example, a processor may be designed with multiple execution units that cannot all operate simultaneously due to either an excessive power dissipation level or a problem in distributing the requisite current level throughout the processor without excessive voltage drop.

However, power management of system components typically introduces latency/availability problems in that recovery from a power saving state involves overhead that reduces processing throughput. Further, traditional memory allocation schemes within operating systems tend to exacerbate the problem by spreading frequently accessed memory locations throughout available memory. Memory allocation and processor-managed power management techniques have been proposed and implemented that alleviate this problem to some degree, but fall short of ideal due to the lack of information or latency of information about actual memory use that could otherwise provide for more efficient power management of infrequently used memory that is allocated for a running process.

At the operating system level, information about changes in power consumption by a device is not as readily available as at the device or device controller level. Further, typical control of power management states of devices by the operating system falls short of the level of power-management responsiveness that may be provided at the device or device controller level. But, control schemes that are only local in nature may not meet a required power consumption limitation that enables operation of a processing system within a current power availability or thermal state. In general, global power availability or overall system temperature is used to dictate a global power limit. For example, in battery-operated systems, overall power availability is dictated by available battery energy. While discrete thermal measurements are possible within a processing system, in general one hotspot, for example a processor package temperature, is used to dictate a limit on power dissipation within a system.

Further, severe power consumption shifts, as occur when a device or group of devices changes power management state simultaneously, generate current spikes that can cause interference disrupting operation of the devices or overall processing system. Therefore, it is desirable to control power consumption within a system so that large changes in power consumption are avoided.

It is therefore desirable to provide a method and system for providing power management within a processing system, and in particular within a memory subsystem, that can control a globally-dictated level of power consumption by providing responsive local control of the power management states of devices. It would further be desirable to provide such control without introducing current spikes due to large shifts in overall power consumption.

SUMMARY OF THE INVENTION

The objective of providing power management within a processing system that can meet globally-dictated power consumption limits while providing responsive local control of power management states of devices is provided in a method, system and device controller for providing local control of power management within a processing system.

Power consumed and dissipated by individual devices and/or groups of devices are bounded by setting a limit on the power consumption of the group. A device controller in accordance with the present invention, or another coordinated control mechanism between the members of the group maintains power consumption below the specified upper limit for the group. An upper bound on power consumption may also be set, so that current spikes in the power distribution network of the processing system are avoided by reducing changes in the power management states of the controlled devices. For example, a memory controller may be bounded such that a minimum number of memory modules will always remain in an active state.

The device controller can be a memory controller, as mentioned above, and the controlled devices can be memory modules coupled to the memory controller. The device controller and device can be any subsystem within a processing system that can be managed and alternatively, or in concert, the devices may be processing locales and the device controllers units responsible for power management for the associated locales.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present invention concerns local control and evaluation of power management settings at the device controller level within a processing system, in conjunction with global control that sets maximum power consumption bounds for groups of devices within the processing system. The above-incorporated patent application discloses a device controller-based power management scheme that provides improved responsiveness to local resource demands, while reducing power consumption of attached devices with a granularity much finer than is possible with global-only power management control schemes. However, if control of power management is left purely at a local level, overall system power consumption cannot be exactly predicted or controlled, as the local controllers solely determine the power management state of the system at a given instant. Further, changes in local power consumption levels due to changing power management states of devices at the local level leads to dramatic changes in the overall system power distribution network and powers supply currents. Large transitions in power consumption are undesirable in that interference is generated in the system digital circuits that may disrupt or degrade operation and additional stresses are placed on the power supply components.

The present invention provides enhancements to local control of power management settings by local controllers that sets a local maximum power consumption level (bound) for each group of devices within a processing system. The local controllers then manage power consumption on a local level, while ensuring that the overall global system power consumption requirement is met. Optionally, a local minimum power consumption level (bound) for each group of devices, so that changes in power consumption level are reduced, reducing current spikes in the power distribution network.

Embodiments of the present invention and the consequent definitions of "local controller" and "groups of devices" include extensions of the techniques of the present invention on both a macro-scale and micro-scale. The group of devices may be a processing system or multiple processing system, which may be a processing system site (locale) with an associated local controller that is the global power management unit for each processing system. A global power management service, typically provided via the standard connection between the processing systems (e.g., a network backplane for multiple locales or multiple discrete systems within one local or an I/O or service processor infrastructure for a group of processors in one unit) provides for determination and communication of the local bounds for each processing system to the system's global power management unit.

At the middle scale, which may be operating in conjunction with the above-described macro-scale power management scheme, the global power management unit for each processing system determines and communicates to each attached device controller, a local power maximum bound for the group of devices associated with the controller, thus enforcing a global power management bound for the processing system. For the middle-level, control of local power management states for the connected devices is generally performed by hardware control circuits that provide high-speed response to changing requirements. However, local processing elements within the device controller may also provide such control via embedded firmware or other local software.

At the lowest level, a device such as a processor, other device or device controller, typically integrated one die or packaged in one package, may include a global power management unit that determines a local maximum bound for each sub-unit in conformity with a global maximum bound for the die/device. Local power management units at each sub-unit then enforce the local maximum bound for each group of units within the die/device. For example, a processor may include a global power management unit that determines or receives a global maximum power bound and determines from that a local bound for I/O pins, a local bound for a floating point unit, a local bound for a fixed point unit, and so forth, providing on-chip discrete power management that maintains power consumption within the global maximum bound, while allowing local flexibility in determining which resources are activated. Control within a die/device is generally provided by digital control circuits, but may be implemented in micro-code or local firmware or other local software, for example via an on-die or in-module service processing element that executes downloaded program instructions.

Local minimum power bounds can also be communicated at any of the above described scales or levels to avoid dramatic changes in power consumption levels. The local minimum bounds may be determined from a global power minimum bound, so that a minimum total power consumption level is maintained in conformity with the global minimum bound. Alternatively, local minimum bounds may be assigned to specific groups of devices, with no requirement that a global minimum level is maintained other than that the sum of the local minimums will guarantee that the minimum power consumption will exceed the sum of the local minimum bounds.

Figure 1:
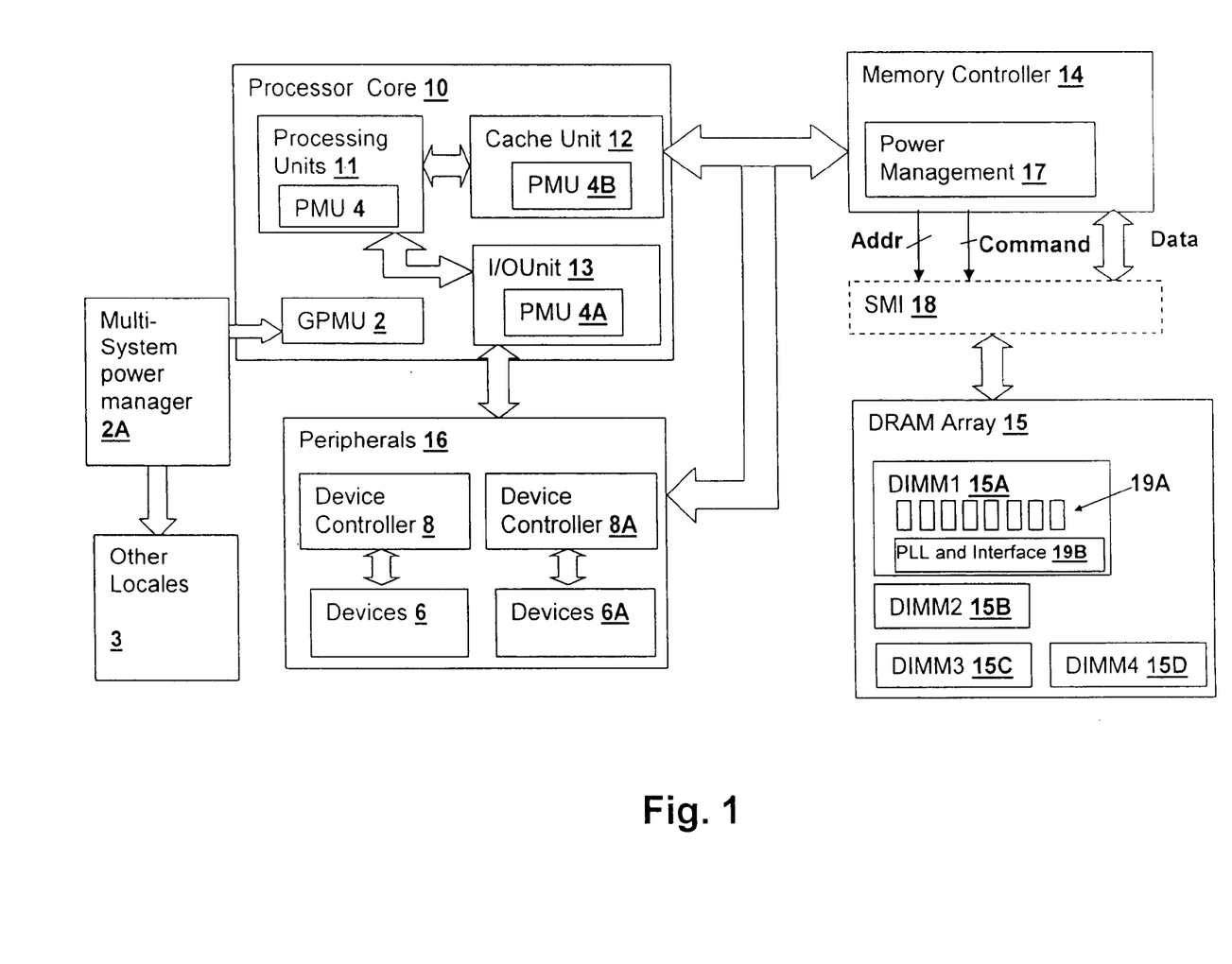
FIG. 1 is a block diagram of a computing system in accordance with an embodiment of the invention.

With reference now to the figures, and in particular with reference to FIG. 1, there is depicted a block diagram of a computer system including a memory controller 14, device controllers 8 and 8A and a processor core 10 embodying methods and circuits in accordance with the present invention. Memory controller 14 is coupled to a dynamic random-access memory (DRAM) array 15 and provides control signals in the form of address lines and command strobes. Memory controller 14 is also coupled to processor core 10 and peripherals 16 for storing and loading program instructions and data. As mentioned above, peripherals 16 also include device controllers 8 and 8A and associated groups of controlled devices 6 and 6A embodying the techniques and structures of the present invention, but for the purposes of illustration, details of the techniques and structures of the present invention will be described as embodied in and applied to memory controller 14. Memory controller 14 includes a novel power management unit 17 that receives a local maximum power bound, and optionally a local minimum power bound from an operating system executed by processor core 10 or from a global power management unit 2 within processor core. Power management unit 17 then enforces the local maximum bound, and optionally the local minimum power bound by controlling the power management state of each module 15A–D within DRAM array 15. Similarly, device controllers 8 and 8A receive and enforce local maximum, and optionally local minimum power consumption bounds for their associated attached groups of devices 6 and 6A, respectively.

Consistent with the micro-scale implementation described above, processor core 10 includes a global power management unit (GPMU) 2 that communicates local maximum power bounds, and optionally local minimum power bounds, to power management units 4, 4A and 4B, that enforce the maximum/minimum power consumption levels of their associated functional units: processing units 11, I/O unit 13 and cache unit 12, respectively.

On the macro-scale described above, processor core 10 is coupled to a multi-system power manager 2A, generally a service that has access to each managed systems operating system power management service, which communicates a local maximum power consumption bound, and optionally a local minimum power consumption bound, that sets a level of power consumption for processor core 10, memory controller 14, DRAM array 15 and peripherals 16, which are generally the mid-level global power consumption bounds used to determine the local bounds for each individual group of devices attached to processor core 10 and processor core 10 itself. Multi-system power manager 2A also provides power consumption bounds to other locales 3 (or systems within the same unit or locale), so that at the macro level, a maximum, and optionally a minimum level of power consumption is enforced. Therefore, the above-described system can provide a hierarchical power-management scheme, with multiple levels of local control of power management enforced by a local bound provided from the next higher level, consistent with a global bound existing at that next higher level which may have been provided from an even higher level as a local bound consistent with enforcing that even higher level's global power consumption requirement.

Further details of local power management techniques consistent with the above description will be illustrated with respect to memory controller 14, but should be understood to applied to the various scales described above. In general, activity or queued accesses will be used by each local controller to make determinations as to which devices within the associated group of devices are placed in various power-management states, so that resource availability is maximized while enforcing the local power consumption bounds received by the controller.

Memory controller 14 determines power management settings for each memory module 15A–15D within DRAM array 15. In larger systems, multiple DRAM arrays 15 may be coupled to memory controller 14 by one or more Synchronous Memory Interfaces (SMIs) 18 which provide partitioning of the memory subsystem into large banks. If incorporated, SMIs 18 could also include local power control and bounding consistent with the features of the present invention, as multiple SMIs 18 may be connected to one memory controller 14 that manages the global power management for the memory subsystem via local bounding at each SMI 18. SMIs 18 may also include the control input mechanisms mentioned above for their connected devices, such as access queue and/or usage counters/evaluators.

Therefore, any inclusion of portions of the structures techniques of the present invention within SMIs 18, should be understood as contemplated by the present invention, as SMIs 18 are device controllers within the context of the present invention.

DRAM array 15 includes multiple dual in-line memory modules (DIMMs) 15A–15D, each of which can be power-managed separately. Other power-management granularity is possible, such as powering down banks within DIMMs 15A–15D, if bank-level power management is possible. However, in general, power management at present is generally performed at the DIMM level. DIMMs 15A–15D each include memory devices 19A and interface circuits 19B that include a phase-lock loop (PLL) for synchronizing the memory device 19A with the DIMM bus interface to SMI 18 or memory controller 14. The power management states available for setting within DIMMs 15A–15D, vary based on design, but generally a low-power standby state, a power down mode, and a self-refresh state are available. In the self-refresh state, the external PLL within interface circuits 19B can be disabled. The PLL consumes a significant amount of the total power consumed by DIMMs 15A–15D, so the self-refresh state is a very desirable power management state, but the recovery time is much longer from the self-refresh state than for the low-power standby state or the power-down mode, as the PLL must be re-synchronized with the external bus.

Figure 2:
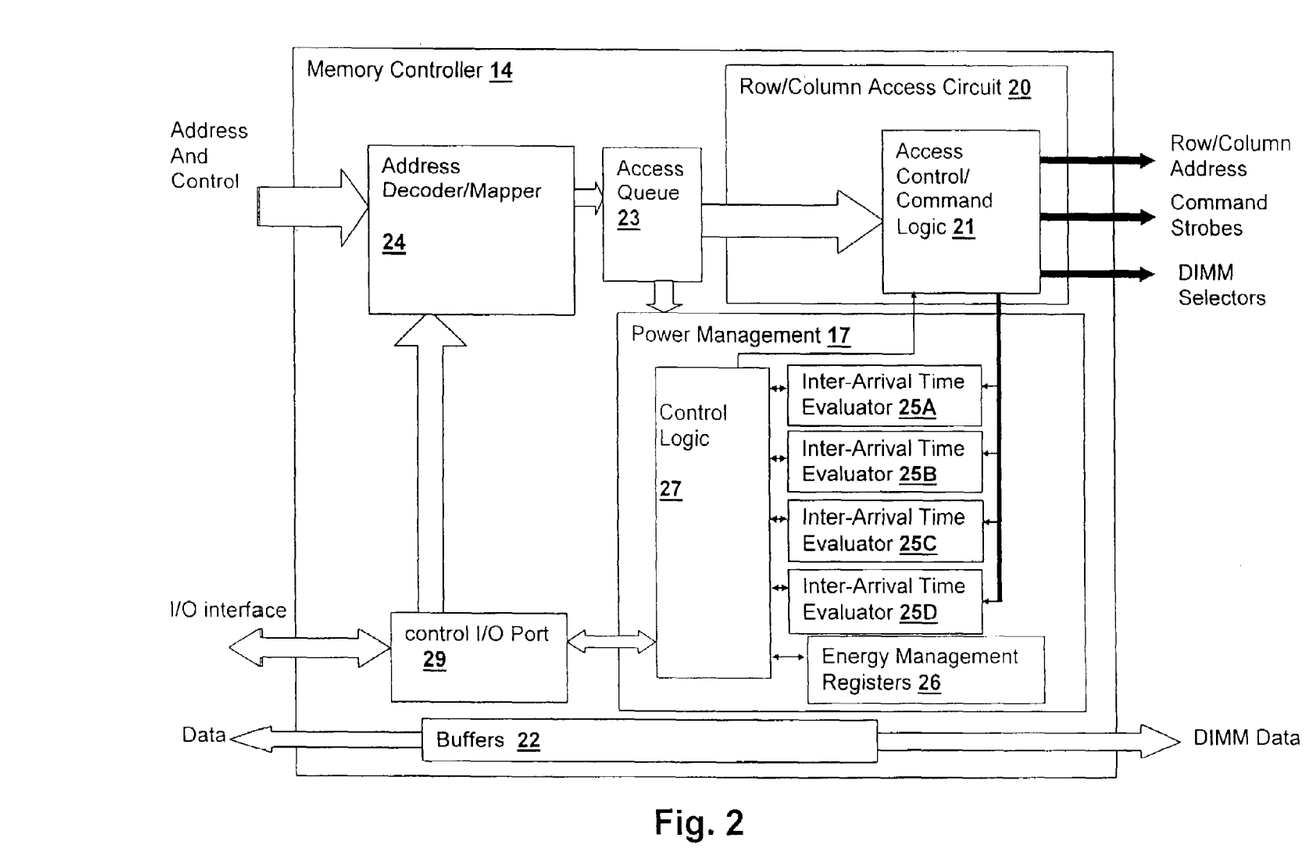
FIG. 2 is a block diagram depicting a memory controller in accordance with an embodiment of the present invention.

Referring now to FIG. 2, details of memory controller 14 are depicted in accordance with an embodiment of the present invention. FIG. 2 is also used generally to describe various embodiments of the present invention in the form of alternative structures in which some internal blocks will be mentioned as optionally located in SMIs or memory modules as described above.

Address and control signals are provided to an address decoder/mapper 24 from processor core 10, peripherals 16 or may be generated internally in the case of refresh or cache control implementations. Address decoder/mapper 24 receives memory access requests that are queued in access queue 23 and are eventually provided to a row/column access circuit 20 that provides command strobes, and DIMM selectors as well as column/row address signals to DIMMs 15A–D via access control/command logic 21 for performing memory accesses. Access control/command logic also forwards commands from power management unit 17 to DIMMs 15A–D for setting power management states of individual DIMMs 15A–D. In embodiments where access counters are provided within DIMMs 15A–D, commands are also forwarded to retrieve the access counts for use by power management unit 17. Memory controller 14 also includes data buffers 22 for buffering data transferred to and from DIMMs 15A–D, as well as a control I/O port 29 for receiving control information from processor core 10, as well as providing register read ports from which processor core 10 can retrieve the current status of memory controller 14. Additionally, control I/O port 29 provides access to registers within power management unit by processor core 10 as will be described in detail below.

Power management unit 17 includes energy management registers 26, that include at least a local maximum power consumption bound and optionally a local minimum power consumption bound for memory controller 14 and associated group of controller devices (SMIs 18 and memory modules 15A–D in the system illustrated in FIG. 1). A control logic 27 determines power management states for each attached device consistent with enforcing the local maximum power consumption bound and any local minimum power consumption bound stored in energy management registers 26 by determining the total power consumption for a given state of each device. Control logic 27 is coupled to access control/command logic 21 so that power management settings can be sent to the controlled devices.

Control logic 27 is also coupled to units that provide information for intelligent control of the power management states of each device consistent with queued accesses via connection to access queue 23, usage of each device as determined by individual usage evaluators 25A–25D or both. Energy management registers 26 may include usage threshold values for determining when a device should be activated, and control logic 27 can activate a device for which predicted usage exceeds a threshold or deactivate a device for which usage falls below a threshold, as long as the local bounds for power consumption are enforced. Thresholds may also be programmed via energy management registers 26, as well as the type of thresholds to be applied, if multiple threshold types are supported by the power management logic. In general, threshold values may be a single fixed threshold, in which the current inter-arrival time (or other significant indicator of memory use such as access frequency) of memory accesses for a given process and module is compared to a level programmed by the operating system. When the inter-arrival time exceeds the predetermined threshold, the particular module is placed in a lower-power operating mode by the device controller via access control and command logic 21. Alternatively, an adaptive threshold may be selected and the threshold adaptively adjusted by control logic 17 so that the threshold level is adjusted based on historical access to the module by the process, or adjusted based on accesses to other modules (power prioritization for limited power allocation schemes).

The techniques described in the above-incorporated patent application may also be employed in conjunction with local power bounding, as the per-process information management that stores and retrieves the states of inter-arrival time evaluators 25A–25D improve the local power management of the connected devices by permitting per-process decision making with respect to expected use of each connected device. The local power bounds are enforced for all processes, such that when a context switch causes a desired change in power management states of connected devices, the local bounds are used to determine whether or not the change can be supported and can either disallow a change, or modify the change. For example, a context switch may indicate that three modules need activation, but the local maximum bound will only allow two modules to be active. Control logic 27 can select the two modules that either have the most accesses queued in access queue 23, have the most activity per inter-arrival time evaluators 25A–25D or select two modules in conformity with both the queued accesses and the inter-arrival time indications.

Figure 3:
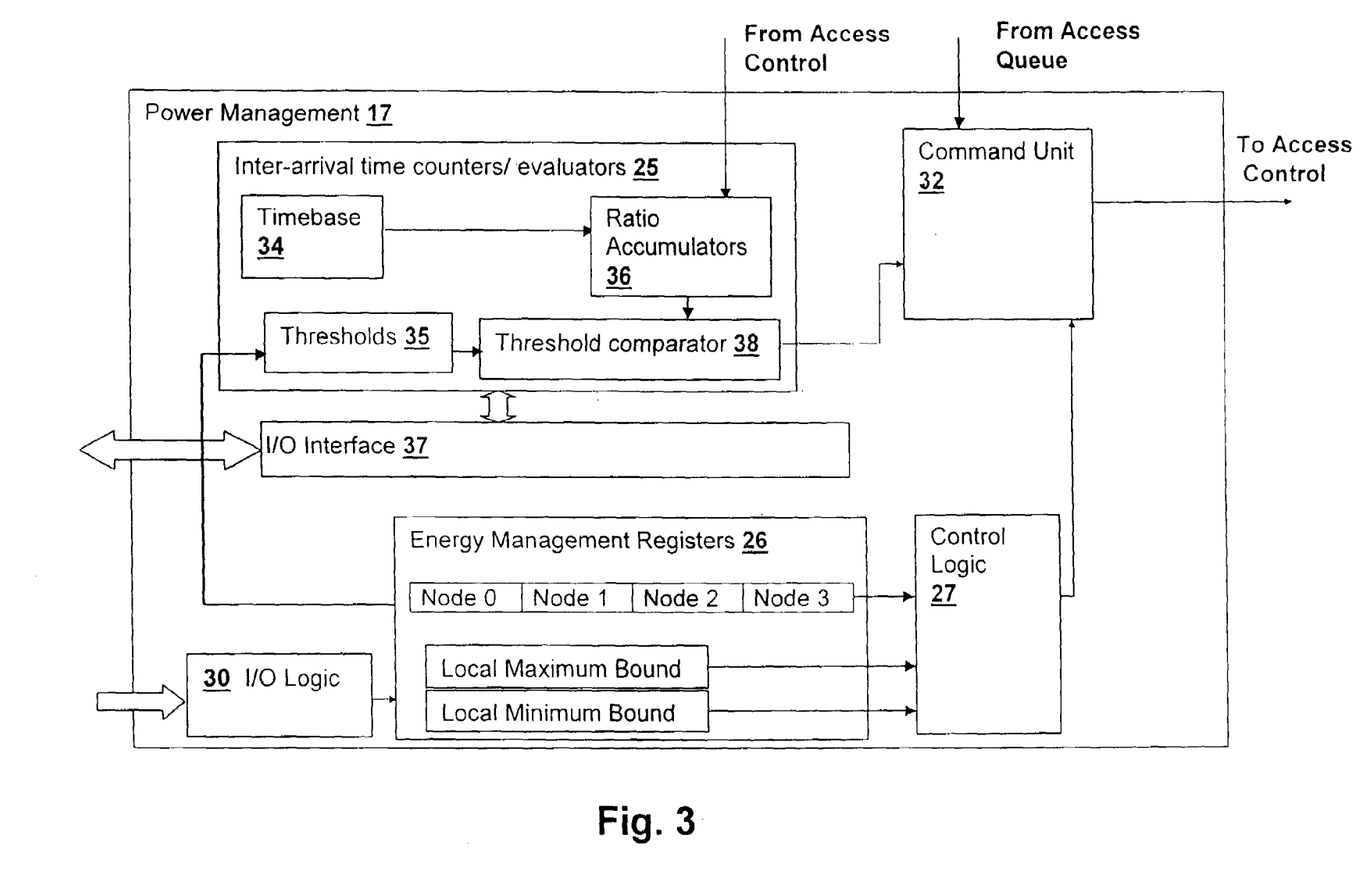
FIG. 3 is a block diagram depicting a power management unit in accordance with an embodiment of the present invention.

Referring now to FIG. 3, further details of power management unit 17 are depicted. Local maximum and optional local minimum power consumption bounds are set in energy management registers 26 via I/O logic 30. Inter-arrival time counters/evaluators 25 for each node may be optionally included to determine whether the frequency of accesses to each node justifies setting a lower power management level and if such determination is made and control logic 27 determines that such change is consistent with the maximum/minimum power bounds set in energy management registers 26, commands are sent to DIMMS 15A–15D via command unit 32 to set new power management states for each of DIMMS 15A–15D. Energy management registers 26 are also coupled to counters/evaluators 25 to apply any threshold information set by the operating system via I/O interface 37 into threshold registers 35. Energy management registers 26 may also include energy management control bits to selectively enable evaluators 25, in particular for turning off evaluators when local control is disabled, in order to conserve the power consumed by evaluators 25, but are also used to enable evaluators periodically when the system is in a power-conserving state. Evaluators 25 compare a number of accesses performed for each device through access control 21 to a fixed timebase 34 via ratio accumulators 36, which estimate the inter-arrival time of accesses based on the frequency of accesses versus timebase 34 counts. A threshold comparator 38 compares the value of the ratio accumulator 36 to a fixed or adaptively derived threshold 35 and if the access inter-arrival time rises above the threshold 35 value, directs control logic 27 to lower the power consuming state of the device, and control logic 27 sends commands through command unit 32 directs command logic to do so if the local power consumption bounds are met.

Alternatively, or in concert, control logic 27 is also coupled to access queue 23 so that local determination of the power management states of DIMMS 15A–15D can be made based on queued accesses, consistent with the enforcement of maximum/minimum power bounds set in energy management registers 26. Control logic 27 determines relative quantities of queued accesses in order to determine which DIMMS 15A–15D should be activated and sends commands to activate as many of DIMMS 15A–15D as the local maximum power consumption bound will allow for which a sufficient number of accesses are queued, while always activating enough of DIMMS 15A–15D to sustain the minimum power consumption bound, if a minimum bound is set.

Figure 4:
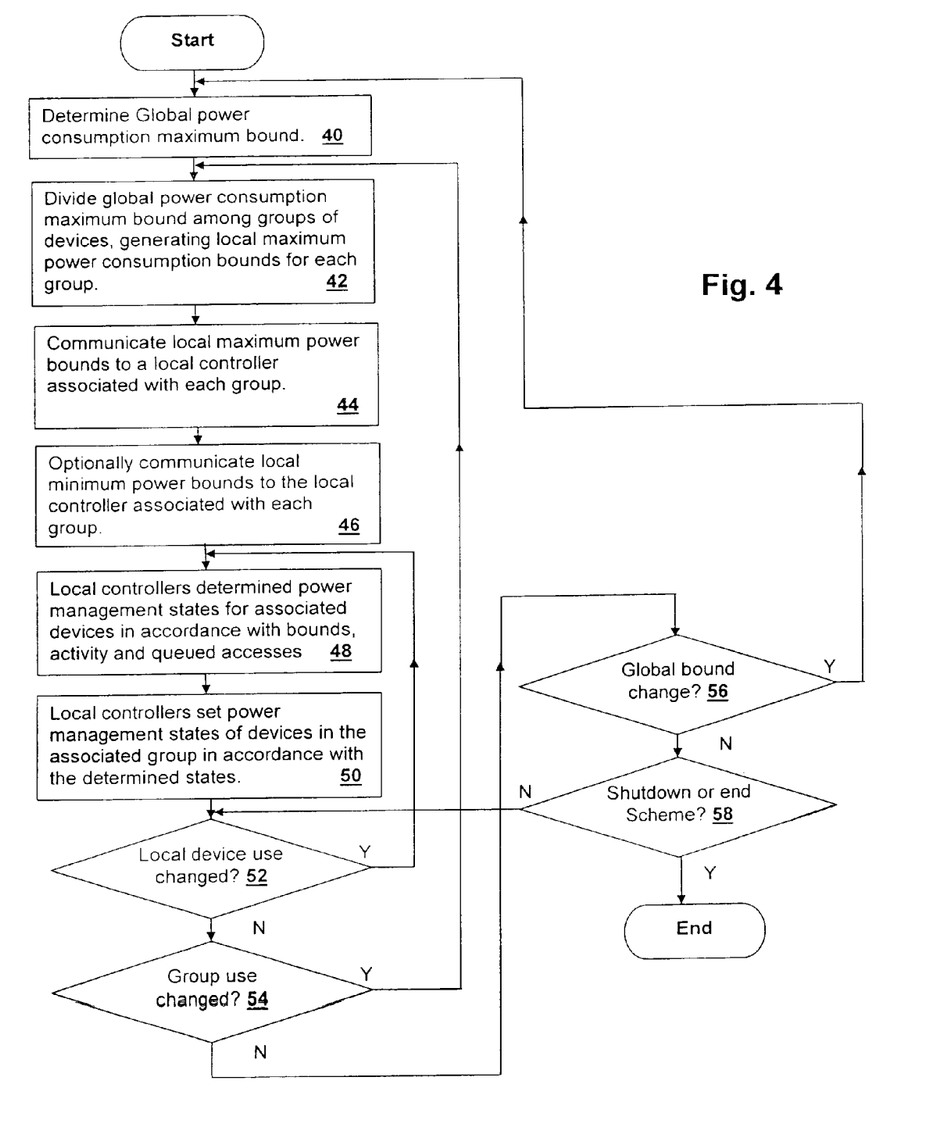
FIG. 4 is a flowchart depicting a method in accordance with an embodiment of the present invention.

Referring now to FIG. 4, a flowchart depicting a method in accordance with an embodiment of the invention is shown. First, a global power consumption maximum bound is determined or set from a higher level of hierarchy (step 40). The global maximum bound value is divided amongst groups of devices (step 42) and the local maximum power consumption bounds are communicated to the local controllers responsible for power managing the associated groups (step 44). Next, any local minimum power bounds are communicated to the associated local controllers (step 46). Then, the local controllers determine which devices within their associated group to activate based on the local power consumption bounds usage plus queued accesses and/or device usage (step 48). Finally, the local controllers manage the power consumed by each group by setting power management states of the devices in the group (step 50). If the usage or queued accesses among the local devices change (decision 52), the local controllers change the power management states of the devices repeating steps 48 and 50. If the relative usage of groups change (decision 54), then the process repeats from step 42, dividing the global power bound into new local power bounds. If the global power bound changes (decision 56), then the global power bound set to the new value and the process is repeated from step 40. Finally, steps 52, 54 and 56 are repeated until the system is shutdown or the power management scheme is disabled (decision 58).

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A method of managing power in a processing system, comprising:
providing a single global maximum power consumption bound for a plurality of groups of devices within said processing system;
determining associated local maximum bounds of power consumption, one for each of said plurality of groups of devices, wherein a sum of said local bounds is less than a global maximum power consumption bound;
communicating each local maximum bound to an associated one of a plurality of local controllers coupled to said associated group of devices;
within each of said associated local controllers, second determining power management states for each device within each of said associated group of devices consistent with said associated local maximum bound, whereby said global maximum power consumption bound is met by meeting all of said local bounds; and
setting said power management state of each device in each of said plurality of groups from each of said associated local controllers.

2. The method of claim 1, wherein said local controllers are memory controllers, said devices are memory modules, and wherein said setting sets a power management state of each of said memory modules from an associated memory controller.

3. The method of claim 1, further comprising evaluating a usage of each of said devices by said device controller in order to determine whether or not said usage of each device has fallen below a threshold, and wherein said second determining determines said power management settings for each particular device in conformity with said measured usage for each particular device.

4. The method of claim 1, wherein each of said local controllers includes a storage containing an access queue for each of said associated devices, and wherein said second determining determines said power management settings for each particular device in conformity with a number of accesses queued for each particular device.

5. The method of claim 1, wherein said processing system includes multiple processing locales, wherein each of said local controllers is a power management controller for an associated processing locale, whereby said second determining and said setting control the power consumption of each of said multiple processing locales in accordance with meeting said global maximum power consumption bound.

6. The method of claim 1, wherein said setting sets power management states of said processing locales including a shutdown state of said processing locales.

7. The method of claim 1, further comprising:
third determining an associated local minimum bound of power consumption for each of a plurality of groups of devices within said processing system; and
communicating each local minimum bound to an associated one of a plurality of local controllers coupled to said associated group of devices, and wherein said second determining further determines power management states for each device within each of said groups of devices within said associated local controller consistent with said associated local minimum bound, whereby changes in power consumption of each of said groups is limited to avoid excessive current spikes within a power distribution network of said processing system.

8. A processing system, comprising:
a processor;
a memory coupled to said processor for storing program instructions and data values;
multiple device controllers coupled to said processor;
a plurality of groups of controlled devices, each group coupled to an associated one of said device controllers, wherein said controlled devices have multiple power management states, and wherein said device controllers each include a command unit for sending commands to said associated devices, whereby said devices are power managed by said associated controller, and wherein said program instructions include program instructions for
receiving a single global maximum power consumption bound for said plurality of groups of controlled devices;
determining associated maximum local bounds of power consumption, one for each of said plurality of groups of devices, wherein a sum of said maximum local bounds is less than a global maximum power consumption bound,
communicating each associated maximum local bound to an associated one of a plurality of local controllers coupled to said associated group of devices, wherein said device controllers include control logic for determining power management states for each device within said associated group of devices consistent with said associated maximum local bound, whereby said global power consumption bound is met by meeting all of said maximum local bounds, and wherein said device controller further comprises a command unit for setting said determined power management state of each associated device.

9. The processing system of claim 8, wherein said device controllers are memory controllers, said devices are memory modules, and wherein said command unit sets a power management state of each associated memory module.

10. The processing system of claim 8, wherein said device controllers further comprise evaluators for evaluating a usage of each associated device in order to determine whether or not said usage of each device has fallen below a threshold, and wherein said control logic further determines said power management settings for each particular device in conformity with said measured usage for each particular device.

11. The processing system of claim 8, wherein said device controllers further include a storage containing an access queue for each of said associated devices, and wherein said control logic further determines said power management settings for each particular device in conformity with a number of accesses queued for each particular device.

12. The processing system of claim 8, wherein said processing system includes multiple processing locales, wherein each of said device controllers is a power management controller for an associated processing locale, whereby said control logic determines the power consumption of each of said multiple processing locales in accordance with meeting said global maximum power consumption bound.

13. The processing system of claim 12, wherein said control sets power management states of said processing locales including a shutdown state of said processing locales.

14. The processing system of claim 8, wherein said control logic comprises a processor for executing local program instructions and memory for storing said local program instructions, and wherein said local program instructions comprise program instructions for determining power management states for each device within said associated group of devices consistent with said associated maximum local bound, whereby said global power consumption bound is met by meeting all of said maximum local bounds.

15. The processing system of claim 8, wherein said program instructions further comprise program instructions for communicating an associated minimum local bound to an associated one of a plurality of local controllers coupled to said associated group of devices, wherein said control logic further determines said power management states for each device within said associated group of devices consistent with said associated minimum local bound, whereby changes in power consumption of each of said groups is limited to avoid excessive current spikes within a power distribution network of said processing system.

* * * * *